(12) United States Patent
Etelson et al.

(10) Patent No.: US 10,664,386 B2
(45) Date of Patent: *May 26, 2020

(54) REMOTELY DEBUGGING AN OPERATING SYSTEM VIA MESSAGES INCLUDING A LIST BACK-TRACE OF APPLICATIONS THAT DISABLE HARDWARE INTERRUPTS

(71) Applicant: INTERNATIONAL BUSINESS MACHINES CORPORATION, Armonk, NY (US)

(72) Inventors: Gregory Etelson, Rehovot (IL); Constantine Gavrilov, Rishon LeZion (IL); Alexander Snast, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,608

(22) Filed: Sep. 17, 2018

(65) Prior Publication Data
US 2019/0018752 A1 Jan. 17, 2019

Related U.S. Application Data

(63) Continuation of application No. 15/083,375, filed on Mar. 29, 2016, now Pat. No. 10,078,576.

(51) Int. Cl.
*G06F 11/36* (2006.01)
*H04L 29/08* (2006.01)
(Continued)

(52) U.S. Cl.
CPC ........ *G06F 11/366* (2013.01); *G06F 11/0712* (2013.01); *G06F 11/362* (2013.01);
(Continued)

(58) Field of Classification Search
CPC .............. G06F 11/366; G06F 11/3664; G06F 11/0712; H04L 41/0654; H04L 41/0672
See application file for complete search history.

(56) References Cited

U.S. PATENT DOCUMENTS 5,568,649 A 10/1996 MacDonald
6,684,281 B1 1/2004 Sugahara
(Continued)

OTHER PUBLICATIONS

Bissyande, "Contributions for Improving Debugging of Kernel-Level Services in a Monolithic Operating System," HAL Archives, Apr. 8, 2013, p. 1-113, HAL ID: tel-00808877, L'UniversitéDe Bordeaux.
(Continued)

*Primary Examiner* — Joseph O Schell
(74) *Attorney, Agent, or Firm* — Robert C. Bunker

(57) ABSTRACT

Remotely debugging a non-responsive operating system (OS) of a computer system. Central processing units (CPUs) in a computer system are bound to receive queues of a network adapter. Interrupts for a CPU is disabled, wherein the CPU is not available to process hardware interrupt requests queued in the bound receive queues. A debugging message including debugging commands is received by the network adapter, wherein the debugging message is stored in a first receive queue of the network adapter bound to a first CPU. If the first CPU is available, the debugging commands in the debugging message stored in the first of the one or more receive queues of the network adapter are identified by a debugger of the computer system. The identified debugging commands are executed by the CPU to debug the non-responsive OS of the computer system.

18 Claims, 6 Drawing Sheets

(51) Int. Cl.
  *G06F 11/07* (2006.01)
  *H04L 12/24* (2006.01)
(52) U.S. Cl.
  CPC ........ *G06F 11/3664* (2013.01); *H04L 67/025* (2013.01); *G06F 11/0709* (2013.01); *G06F 11/0793* (2013.01); *H04L 41/0672* (2013.01)

(56) References Cited

U.S. PATENT DOCUMENTS

| | | | |
|---|---|---|---|
| 7,269,768 B2 | 9/2007 | Rothman et al. | |
| 8,356,285 B2 | 1/2013 | Schuba et al. | |
| 9,037,754 B2 | 5/2015 | Talla | |
| 9,720,739 B2 | 8/2017 | Ding | |
| 2003/0009548 A1 | 1/2003 | Poynor | |
| 2003/0187914 A1 | 10/2003 | Kaniyar | |
| 2006/0227788 A1* | 10/2006 | Eldar | H04L 49/90 370/395.4 |
| 2007/0266376 A1* | 11/2007 | Yim | G06F 11/3644 717/129 |
| 2008/0148015 A1 | 6/2008 | Takamoto | |
| 2008/0181254 A1 | 7/2008 | Chuo | |
| 2011/0004791 A1 | 1/2011 | Kokubu | |
| 2012/0215917 A1 | 8/2012 | Ramamurthy | |
| 2015/0067402 A1* | 3/2015 | Lee | G06F 11/079 714/37 |
| 2015/0324306 A1 | 11/2015 | Chudgar | |
| 2017/0153964 A1 | 6/2017 | Betz | |
| 2017/0286257 A1 | 10/2017 | Etelson et al. | |

OTHER PUBLICATIONS

Cisco Systems, "Cisco MDS 9000 Family Troubleshooting Guide," Cisco MDS Manual, Mar. 2003, 87 Pages, Cisco MDS SAN-OS Release 1.0(3a).

Keuper, "XNU: A Security Evaluation," University of Twente and Certified Secure, Dec. 13, 2012, p. 1-86.

Lehey, "Debugging Kernel Problems," BSDCan 2006, May 11, 2006, p. 1-155, Ottawa, Canada.

Mell et al., "The NIST Definition of Cloud Computing," National Institute of Standards and Technology, Sep. 2011, p. 1-3, Special Publication 800-145.

Parziale et al., "Problem Determination for Linux on System z," IBM Redbooks, Mar. 2008, p. 1-338, SG24-7599-00, International Business Machines Corporation.

Sultan et al., "Recovering Internet Service Sessions from Operating System Failures," IEEE Internet Computing, Mar.-Apr. 2005, p. 1-10, vol. 9, Issue 2.

Wikipedia, "Transmission Control Protocol," Wikipedia: the Free Encyclopedia, Mar. 27, 2016, 11 Pages, https://en.wikipedia.org/wiki/Transmission_Control_Protocol.

\* cited by examiner

REMOTELY DEBUGGING AN OPERATING SYSTEM VIA MESSAGES INCLUDING A LIST BACK-TRACE OF APPLICATIONS THAT DISABLE HARDWARE INTERRUPTS

BACKGROUND OF THE INVENTION

The present invention relates generally to the field of kernel debugging, and more particularly to remotely debugging a non-responsive computer system using a network adapter.

SUMMARY

Embodiments of the present invention provide systems, methods, and computer program products for remotely debugging an operating system (OS) of a computer system. Each of a plurality of central processing units (CPUs) in a computer system is bound to one or more receive queues of a network adapter, wherein each of the one or more receive queues is configured to queue a hardware interrupt request of the network adapter. Interrupts for one or more of the plurality of CPUs are disabled, wherein the one or more of the plurality of CPUs are not available to process hardware interrupt requests queued in the one or more bound receive queues, and an OS of the computer system becomes non-responsive. A debugging message including debugging commands is received by the network adapter, wherein the debugging message is stored in a first of the one or more receive queues of the network adapter bound to a first of the plurality of CPUs, and wherein the debugging message corresponds to a first hardware interrupt request queued in the first of the one or more receive queues. Responsive to determining that a first of the plurality of CPUs is available to process the first hardware interrupt request, the debugging commands in the debugging message stored in the first of the one or more receive queues of the network adapter are identified by a debugger of the computer system. The identified debugging commands are executed by the first of the plurality of CPU's to debug the non-responsive OS of the computer system.

DETAILED DESCRIPTION

Figure 1:
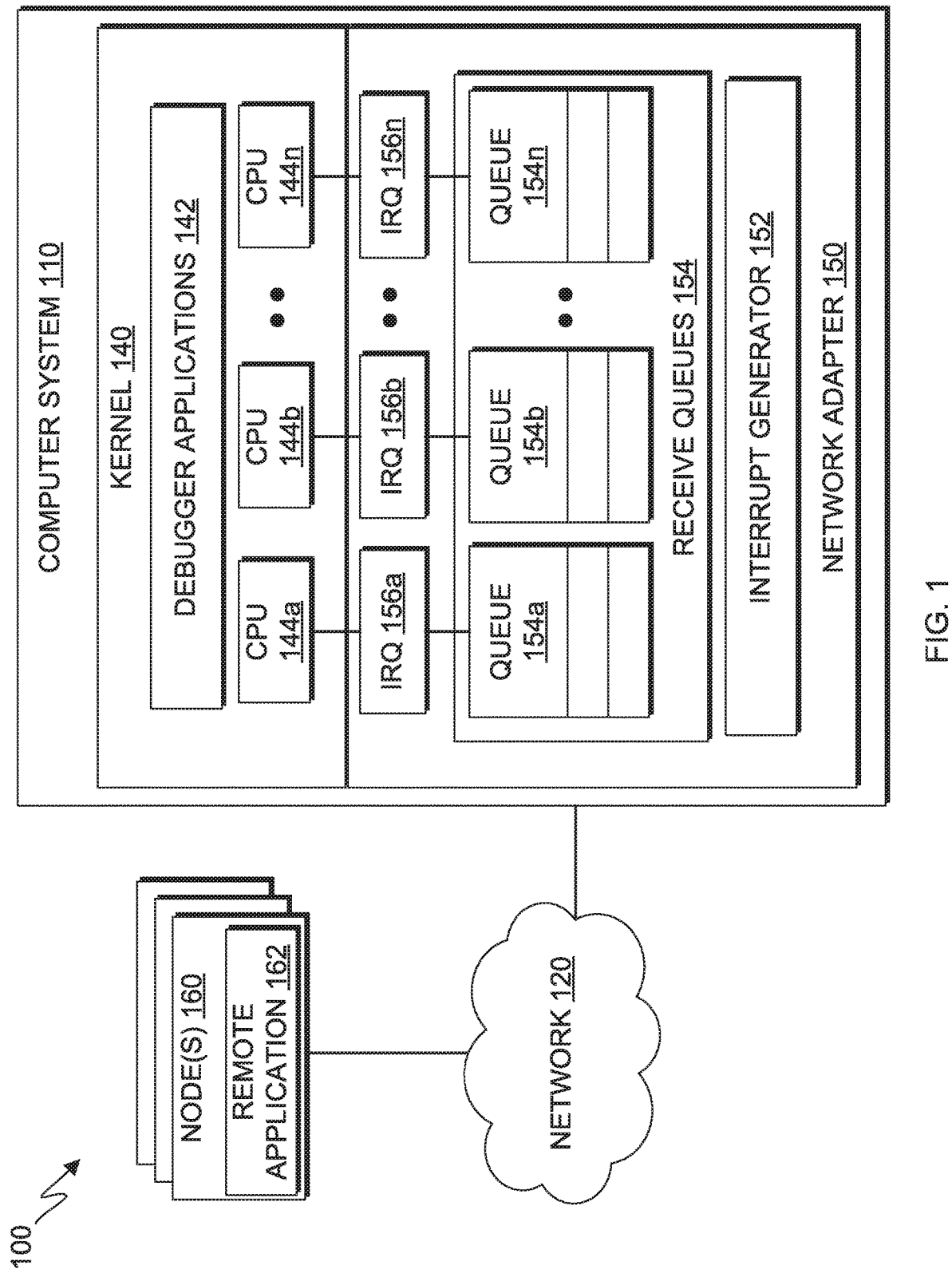
FIG. 1 is a block diagram of a debugging environment, in accordance with an embodiment of the present invention.

A computing processing unit (CPU) of a computer system can carry out a set of instructions of a computer program by performing basic arithmetic, logical, control, and input/output (I/O) operations. While a CPU carries out instructions, a signal to the CPU, such as an interrupt, can be emitted by a hardware device or a software program indicating that an event requires immediate attention. A hardware interrupt can be referred to as an interrupt request (IRQ) that is sent from an external hardware device to a CPU. For example, actuating a key on a keyboard device and/or moving a mouse device may involve the respective hardware device transmitting IRQs. The CPU can handle the transmitted IRQs by processing the keystroke or mouse position. Typically, IRQs are asynchronous, such that they may be pending and can be received and processed while a CPU is carrying out a set of instructions of a computer program.

If an IRQ is received by a CPU while the CPU is carrying out a set of instructions for a computer program, then the CPU handles the IRQ by undergoing a context switch from a user mode to a kernel mode. A user mode is a restricted mode of operation for a CPU, such that certain instructions cannot be executed, certain registers cannot be accessed, and I/O devices cannot be accessed. In contrast, a kernel mode has none of the previously mentioned restrictions associated with the user mode.

In one example, a set of instructions for a computer program can be carried out by a CPU operating in a user mode. The CPU may finish executing a first portion of the set of instructions, or a current instruction cycle for the set of instructions, and determine whether any IRQs are pending (i.e., an IRQ received during the execution of the current instruction cycle). If an IRQ is pending after the execution of the current instruction cycle, then the CPU switches context to operate in kernel mode. Once in kernel mode, information related to the computer program execution can be stored by the CPU, such that once the pending IRQ is handled, the CPU may resume carrying out the rest of the set of instructions of the computer program. Afterwards, a device service for the pending IRQ, or a respective interrupt service request (ISR), can be executed by the CPU in the kernel mode. Subsequently, in the kernel mode, the CPU may receive the stored information related to the computer program execution. Finally, the CPU can switch context to operate in the user mode, such that the remaining portions of the set of instructions for the computer program can continue to be carried out by the CPU. It should be noted that, while a CPU handles a pending IRQ in the kernel mode, an operating system (OS) can disable interrupts for the CPU, such that the CPU maintains exclusive access to internal data structures for handling the pending IRQ making the CPU unavailable.

If interrupts are disabled for one or more CPUs of a computer system, an OS of the computer system can be non-responsive (e.g., stop task scheduling). Typically, if the OS is non-responsive, then a kernel debugger of the computer system cannot be used to investigate and troubleshoot the OS, because keyboard or serial port inputs IRQs are bound to the one or more CPUs with interrupts disabled. Accordingly, a debugging application on a remote computer system may be used to investigate and troubleshoot a non-responsive OS.

For example, if an OS of a computer system is non-responsive, then a remote debugging application of a remote node connected to the computer system by a network can identify an available CPU of the computer system. A local debugger of the computer system can examine messages transmitted from the remote debugging application, and then the available CPU can execute commands to debug the non-responsive OS based on the examined messages.

Embodiments of the present invention provide methods, systems, and computer program products for remotely debugging an OS using a network adapter. Embodiments of the present invention can provide a debugging protocol to troubleshoot a non-responsive OS using a debugger application in a kernel mode and other remote applications connected to a network.

FIG. 1 is a functional block diagram of debugging environment 100 in accordance with an embodiment of the present invention. Debugging environment 100 includes computer system 110 and one or more nodes 160. Computer system 110 and each of nodes 160 can be desktop computers, laptop computers, specialized computer servers, or the like. In certain embodiments, computer system 110 and each of nodes 160 represent computer systems utilizing clustered computers and components to act as a single pool of seamless resources when accessed through network 120. In certain embodiments, computer system 110 and each of nodes 160 represent virtual machines. In general, computer system 110 and each of nodes 160 are representative of any electronic devices, or combination of electronic devices, capable of executing machine-readable program instructions, as described in greater detail with regard to FIG. 4. In other embodiments, computer system 110 and each of nodes 160 may be implemented in a cloud computing environment, as described in greater detail with regard to FIGS. 5 and 6.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computer system 110 and each of nodes 160, in accordance with a desired embodiment of the invention.

Computer system 110 represents a platform that includes an OS which can be non-responsive. If an OS of computer system 110 is non-responsive, then computer system 110 can receive debugging messages from nodes 160 and components therein over network 120 to troubleshoot the non-responsive OS of computer system 110. In this embodiment, computer system 110 includes kernel 140 and network adapter 150, as described in greater detail below.

Kernel 140 represents program functionality for providing basic services for an OS of computer system 110, such as memory management, process management, file management, and I/O management (accessing peripheral devices). Kernel 140 can perform tasks, such as executing processes and handling interrupts, in a kernel space which is separate from a user space. This separation is to ensure that kernel data is not over written or unintentionally interfered with. Although not depicted, in one embodiment, kernel 140 can include a scheduler which determines how processes share kernel processing time, a supervisor which grants use of computer system 110 to each scheduled process, an interrupt handler which handles all requests from various hardware devices, and a memory manager which allocates locations in memory for kernel services.

Debugger applications 142 represent program functionalities for handling debugging events that occur in computer system 110. The phrase, "debugging event," as used herein, refers to an incident in a normal operation (e.g., carrying out a set of instructions, handling an interrupt, etc.) that causes debugger applications 142 to implement debugging protocols. Debugger applications 142 may be kernel debuggers which are activated (e.g., implement debugging protocols) when an exception is raised, a breakpoint is met, or a debugging service is requested. In one embodiment, debugger applications 142 can examine a payload of a network packet to identify debugging commands, as described in greater detail below.

CPUs 144a-n represent processing units that carry out instruction sets for a computer program of computer system 110 and receive hardware interrupts from hardware devices. In an embodiment, computer system 110 may contain any number of 'n' central processing units. For example, if computer system 110 includes 'n' central processing units where 'n' is five, then computer system 110 includes CPU 144a, 144b, 144c, 144d, and 144e. CPUs 144a-n can initiate an ISR for a respective hardware interrupt received from a specific hardware device. For example, if a key on a keyboard device is actuated, then one of CPUs 144a-n that is bound to (i.e., connected to) hardware interrupts for the keyboard device, receives the hardware interrupt for the keystroke and initiates a respective ISR.

Network adapter 150 represents a component of computer system 110 used for communicating over network 120 with each of the one or more nodes 160. In one embodiment, network adapter 150 can be an Ethernet adapter, Ethernet host adapter, Local Area Network (LAN) adapter, Ethernet card, network card, or network interface card (NIC). In other embodiments, other network technologies can be supported by network adapter 150, such as 802.11, Wi-Fi, or other wireless network technologies. Network adapter 150 is configured to provide network steering functionality, such that received debugging messages can be stored in specific storage areas (e.g., receive queues 154a-n), based on a destination vector, as described in greater detail below. In this embodiment, network adapter 150 includes interrupt generator 152 which generates hardware interrupts that are subsequently queued in receive queues 154 as IRQs 156a-n.

Interrupt generator 152 represents component functionality that receives input signals from network adapter 150 and generates hardware interrupts from the received input signals. For example, if a packet of network data, or a network packet, is received by network adapter 150, then interrupt generator 152 can generate one or more hardware interrupts and queue the one or more hardware interrupts as IRQs 156a-n, such that one of CPUs 144a-n that is available can handle the one or more hardware interrupts.

Receive queues 154 represent storage areas that include received debugging messages and hardware interrupts generated from interrupt generator 152. In an embodiment, network adapter 150 may contain any number of 'n' receive queues 154. For example, if network adapter 150 includes 'n' receive queues 154 where 'n' is five, then network adapter 150 includes receive queue 154a, 154b, 154c, 154d, and 154e. In this embodiment, each of receive queues 154a-n are bound to one of CPUs 144a-n, such that debugging applications 142 can use hardware interrupts queued in receive queues 154 to process received debugging messages. For example, debugging applications 142 can examine payloads of received network packets to identify debugging commands that can be later executed by one of CPUs 144a-n that is available, as described in greater detail below.

IRQs 156a-n represent hardware interrupt requests from network adapter 150 that are queued in receive queues 154a-n. In this embodiment, each of receive queues 154a-n is bound to (i.e., connected to) one of IRQs 156a-n. In this embodiment, receive queue 154a is bound to IRQ 156a, such that CPU 144a is configured to handle IRQ 156a. Similarly, receive queue 154b is bound to IRQ 156b, such that CPU 144b is configured to handle IRQ 156b, and receive queue 154n is bound to IRQ 156n, such that CPU 144*n* is configured to handle IRQ 156*n*. As previously discussed, in another embodiment, computer system 110 may contain any number 'n' of IRQs. For example, if computer system 110 includes 'n' IRQs where 'n' is five, then computer system 110 includes IRQ 156*a*, 156*b*, 156*c*, 156*d*, and 156*e*.

Nodes 160 represent one or more remote platforms that include remote application 162. Remote application 162 represents program functionality in each one of nodes 160 for generating and transmitting debugging messages to troubleshoot a non-responsive OS of computer system 110. Debugging messages can include: a back-trace of a specific CPU 144*a-n*, a register state of a specific CPU 144*a-n*, a process list, a process back-trace, enable/disable interrupts for a specific CPU 144*a-n*, initiate hardware interrupt debugging, a list back-trace of application programs that disabled one of IRQs 156*a-n* for the bound one of CPUs 144*a-n*. For example, if an OS of computer system 110 is non-responsive, then remote application 162 may be notified with information related to a debugging event. Subsequently, remote application 162 generates debugging messages and transmits the generated debugging messages to computer system 110.

In this embodiment, nodes 160 are bound to receive queues 154*a-n* by a destination vector implemented by network adapter 150. For example, network adapter 150 may define a destination vector to bind each one of receive queues 154*a-n* to nodes 160 based on an Internet Protocol (IP) address, InfiniBand address, InfiniBand connection, Fibre Channel (FC) address, FC connection, vendor defined management attribute in a data payload, or another network interface identification and location addressing mechanism. Remote application 162 can leverage the network packet steering capabilities provided by network adapter 150 to identify one of one of CPUs 144*a-n* that is available to carry out debugging commands, as described in greater detail below.

In one embodiment, if an OS of computer system 110 is non-responsive, then remote application 162 generates debugging messages that are transmitted to computer system 110 over network 120. For example, the debugging messages can be transmitted as network packets including payloads. Interrupt generator 152 can generate hardware interrupts for the received debugging messages which are queued into receive queues 154*a-n* as IRQs 156*a-n*. Each one of CPUs 144*a-n* can be bound to a particular IRQ 156*a-n*, such that one of CPUs 144*a-n* may be available to handle a bound IRQ 156*a-n*. Once one of CPUs 144*a-n* is identified as available, debugger applications 142 can examine payloads of received network packets, and identify debugging commands. Subsequently, the one of CPUs 144*a-n* that is identified as available can execute the debugging commands.

Figure 2:
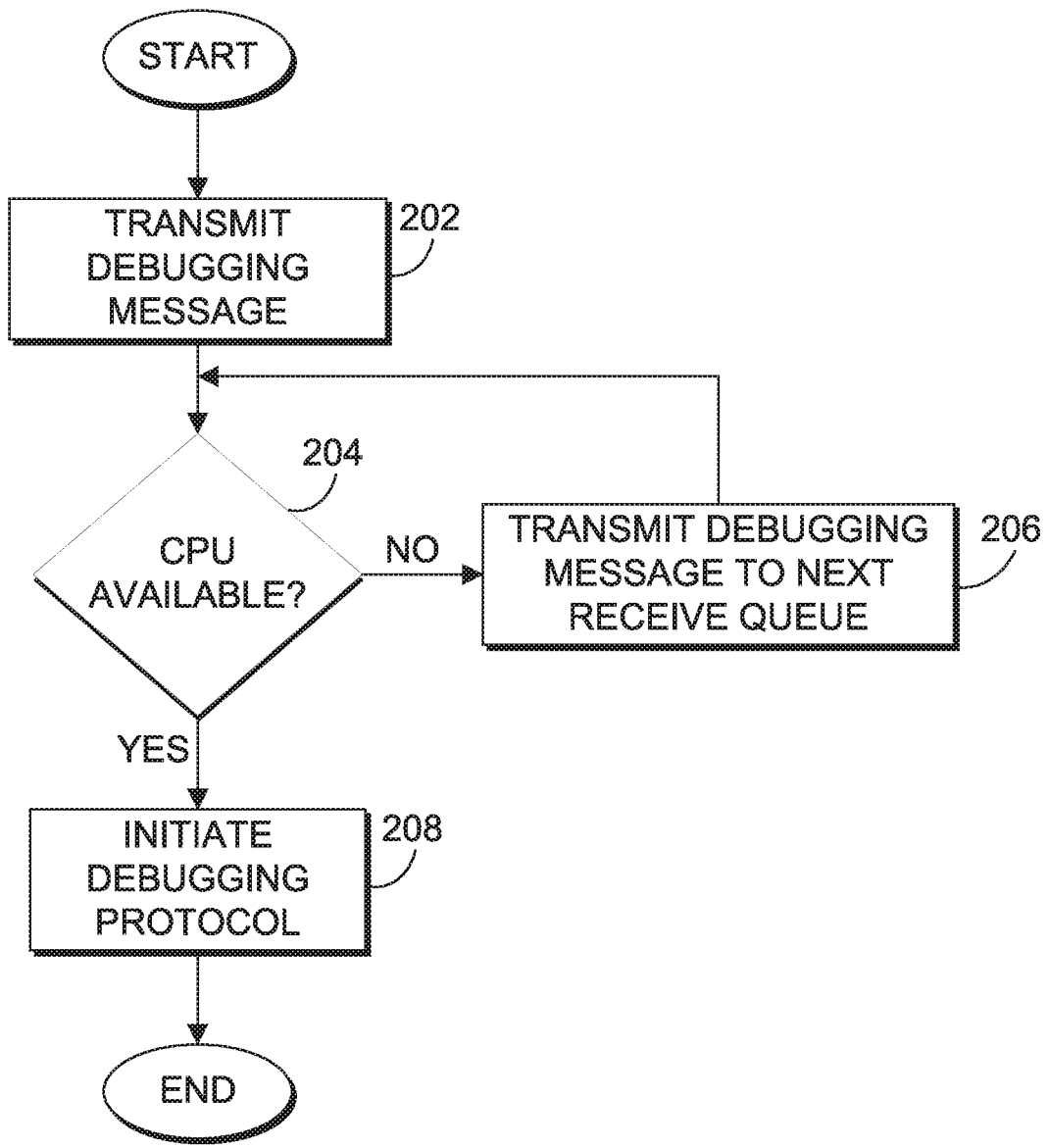
FIG. 2 is a flowchart illustrating operational steps for initiating a debugging protocol, in accordance with an embodiment of the present invention.

FIG. 2 is a flowchart illustrating operational steps for initiating a debugging protocol, in accordance with an embodiment of the present invention. In this embodiment, an OS of computer system 110 is non-responsive and requires debugging. As previously discussed, each of receive queues 154*a-n* is bound to a specific IRQ 156*a-n*. Each of IRQs 156*a-n* are then bound to a specific CPU 144*a-n*, such that IRQ 156*a* and receive queue 154*a* are bound to CPU 144*a*, IRQ 156*b* and receive queue 154*b* are bound to CPU 144*b*, and IRQ 156*n* and receive queue 154*n* is bound to CPU 144*n*.

Remote application 162 transmits debugging messages to computer system 110 via network 120 (step 202). In this embodiment, debugging messages are received in network packets by network adapter 150. Then, a pending hardware interrupt for the received debugging messages are queued into one of receive queues 154*a-n* as one of IRQs 156*a-n*, based on a destination vector. Remote application 162 determines whether one of CPUs 144*a-n* is available to process the pending hardware interrupt (decision 204). For example, if the pending hardware interrupt is queued in receive queue 154*a* as IRQ 156*a*, then remote application 162 determines whether the bound CPU 144*a* acknowledges the bound IRQ 156*a*. If it is determined that the one of CPUs 144*a-n* is not available ('no' block decision 204), then remote application 162 transmits the debugging messages to computer system 110 again, such that the hardware interrupt for the network packets relating to the debugging messages is eventually queued in a different receive queue 154*a-n* (step 206). For example, if the pending hardware interrupt is queued in receive queue 154*a* as IRQ 156*a*, and remote application 162 determines that the bound CPU 144*a* does not acknowledge the bound IRQ 156*a*, then the pending hardware interrupt is queued in receive queue 154*b* as IRQ 156*b*, and remote application 162 determines whether the bound CPU 144*b* acknowledges the bound IRQ 156*b*. If it is determined that the one of CPUs 144*a-n* acknowledges the bound IRQ 156*a-n*, (i.e., is available to process the hardware interrupt for the network packets relating to the debugging messages) ('yes' block, decision 204), then the one of CPUs 144*a-n* that is available communicates with debugging application 142 to initiate debugging protocol (step 208).

Figure 3:
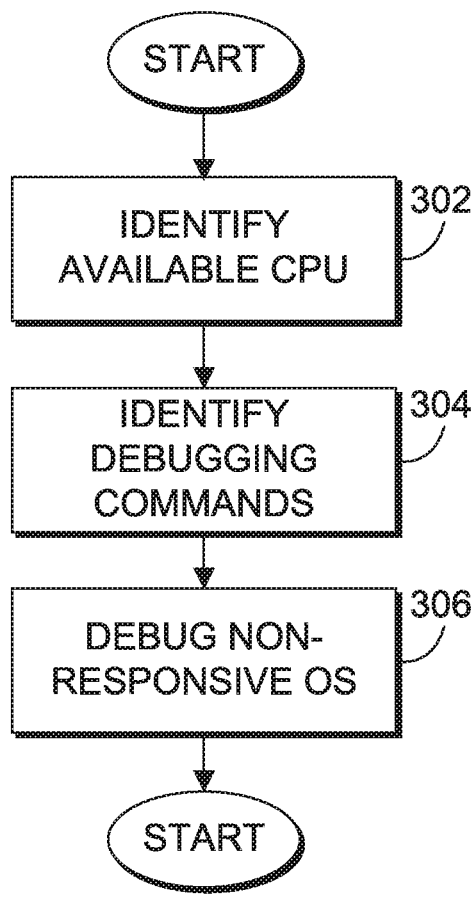
FIG. 3 is a flowchart illustrating operational steps for debugging a non-responsive operating system (OS) of a computer system, in accordance with an embodiment of the present invention.

FIG. 3 is a flowchart illustrating operational steps for debugging a non-responsive OS of computer system 110, in accordance with an embodiment of the present invention. In this embodiment, remote application 162 identifies one of CPUs 144*a-n* that is available, as previously described in greater detail with regard to FIG. 2 (step 302). Debugger applications 142 identifies debugging commands (step 304). In this embodiment, debugger applications 142 examines payloads of received network packets relating to the debugging messages to identify debugging commands. Once the debugging commands are identified, the one of CPUs 144*a-n* that remote application 162 identified as available executes the identified debugging commands to debug the non-responsive OS of computer system 110 (step 306).

In another embodiment, an OS of computer system 110 can be non-responsive, such that an appropriate ISR is executed for a pending interrupt. For example, a fatal event (e.g., a memory access violation), a non-maskable interrupt, a previously placed breakpoint, or watch-point, will result in execution of an appropriate ISR routine. During the execution of the ISR, one of CPUs 144*a-n* that handled the pending interrupt relating to the ISR routine can allocate one of nodes 160 for remote debugging, and notify remote application 162 with the debugging event. For example, remote application 162 can be notified of the debugging event via a push notification that triggers a debugging session, such as e-mail, text message, Simple Network Management Protocol (SNMP) trap, network packet, etc.

Figure 4:
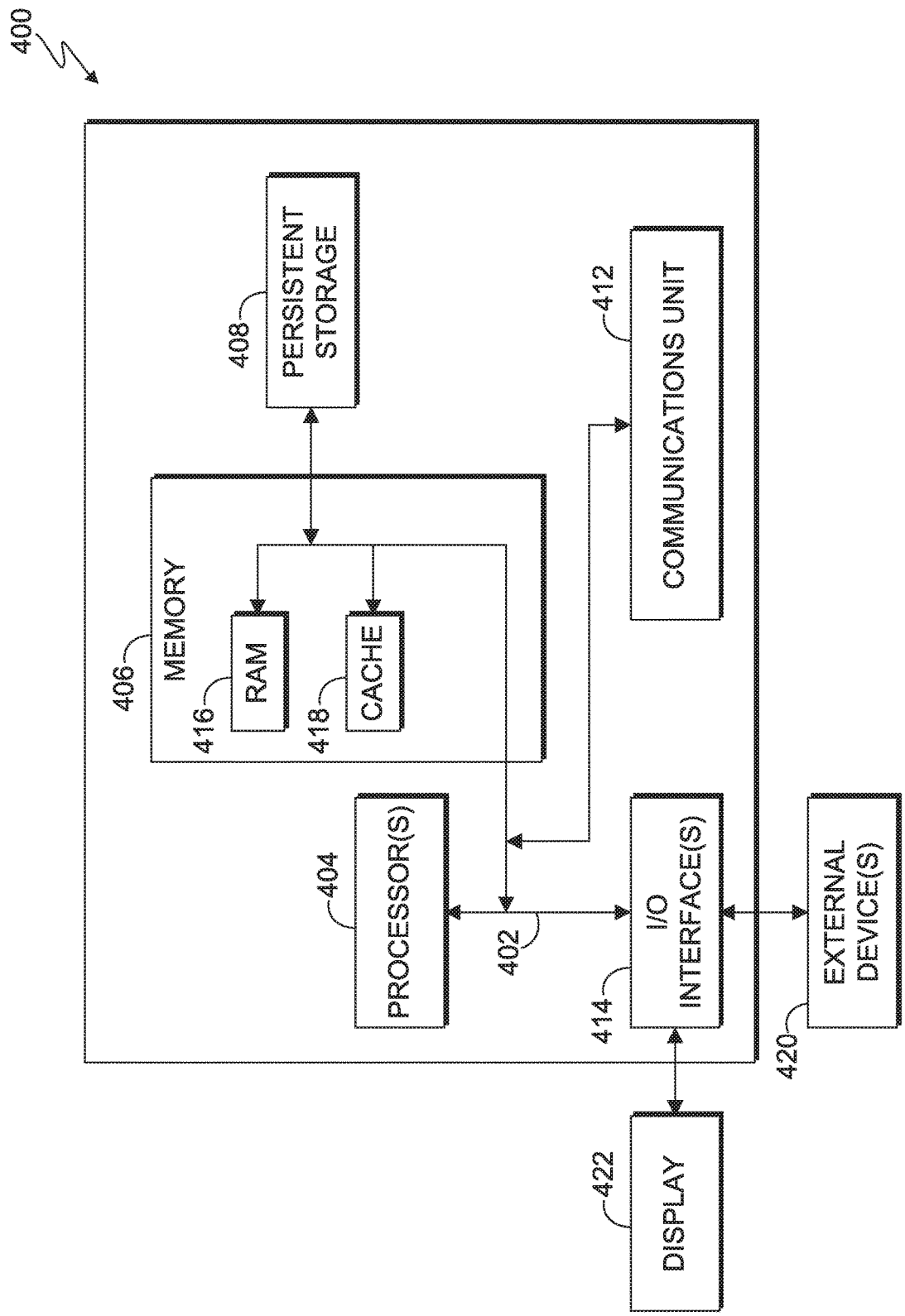
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions.

Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
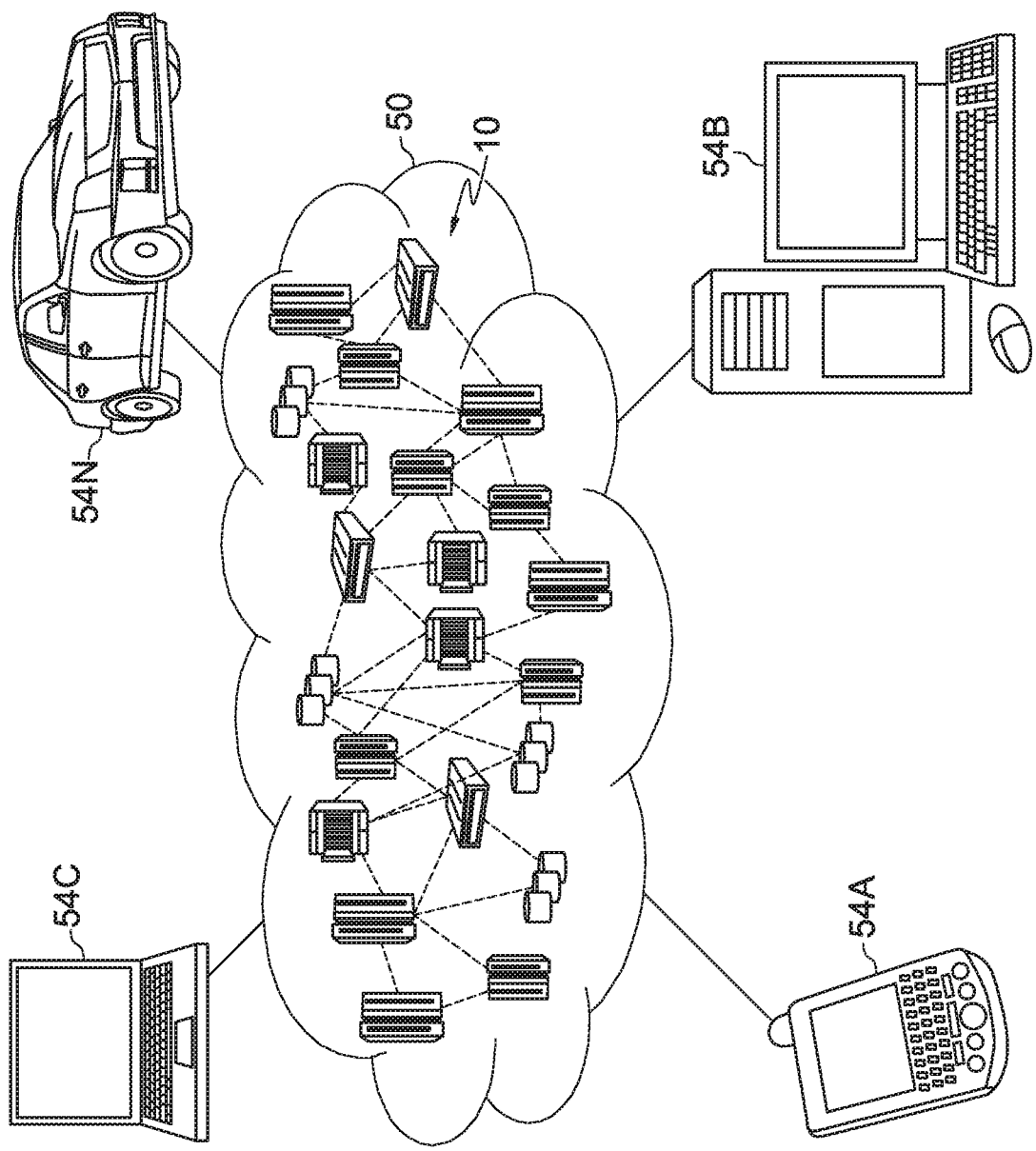
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
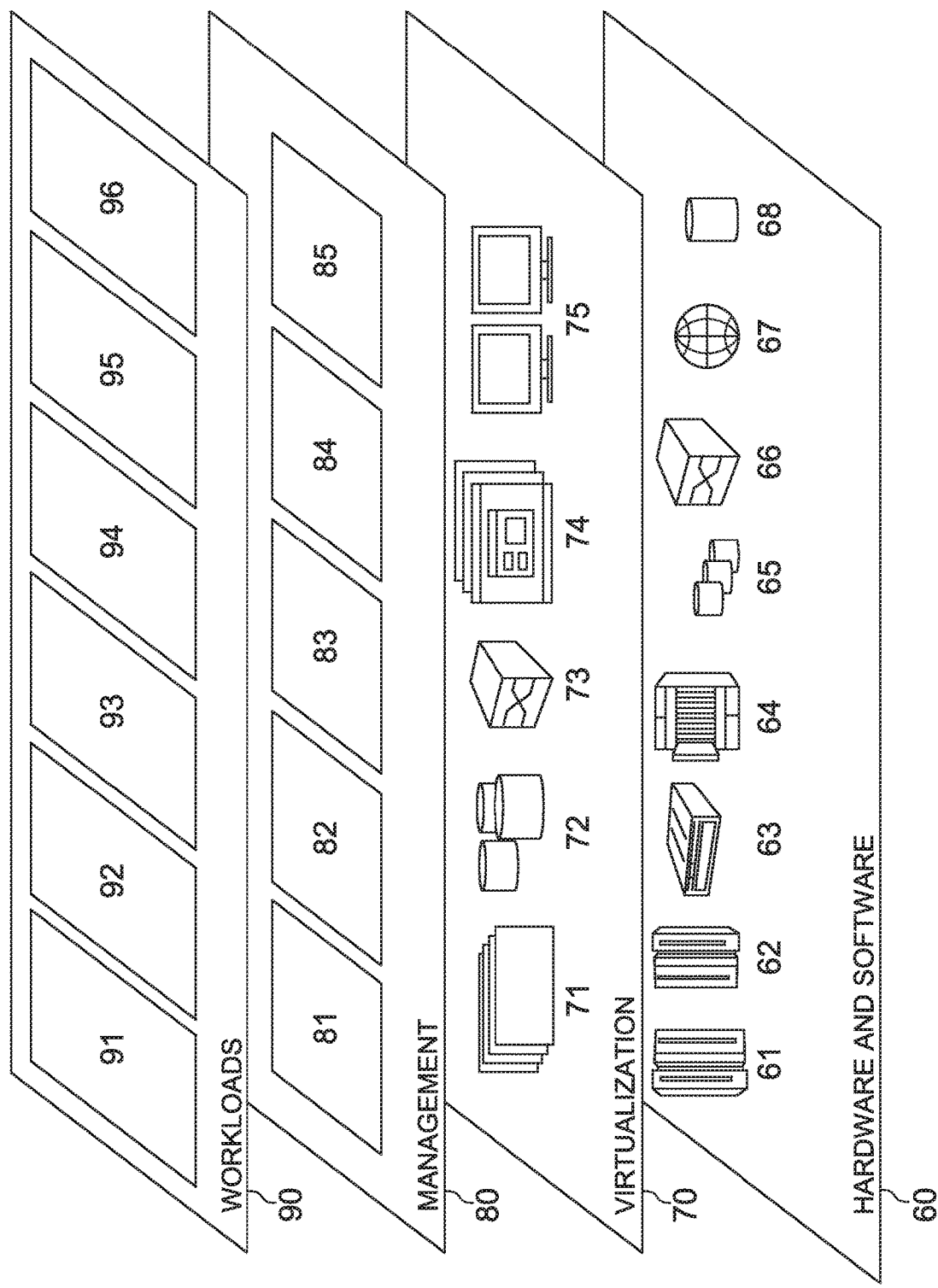
FIG. 6 depicts abstraction model layers, in accordance with an embodiment of the present invention.

Referring now to FIG. 6, a set of functional abstraction layers provided by cloud computing environment 50 (FIG. 5) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debugging environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    binding each of a plurality of central processing units (CPUs) in a computer system to one or more receive queues of a network adapter, wherein each of the one or more receive queues is configured to queue a hardware interrupt request of the network adapter;
    disabling interrupts for one or more of the plurality of CPUs, wherein the one or more of the plurality of CPUs are not available to process hardware interrupt requests queued in the one or more bound receive queues, and an operating system (OS) of the computer system becomes non-responsive;
    receiving, by the network adapter, a debugging message including debugging commands, wherein the debugging message is stored in a first of the one or more receive queues of the network adapter bound to a first of the plurality of CPUs, and wherein the debugging message corresponds to a first hardware interrupt request queued in the first of the one or more receive queues, wherein the debugging message includes a list back-trace of one or more application programs that disabled one or more hardware interrupts;

responsive to determining that the first of the plurality of CPUs is not available to process the first hardware interrupt, receiving, by the network adapter, the debugging message including debugging commands, wherein the debugging message is stored in a second of the one or more receive queues of the network adapter bound to a second of the plurality of CPUs, and wherein the debugging message corresponds to a second hardware interrupt request queued in the second of the one or more receive queues; and executing the identified debugging commands, by the second of the plurality of CPU's to debug the non-responsive OS of the computer system.

2. The method of claim 1, further comprising:

binding, by the network adapter, the one or more receive queues to a remote node using a destination vector based on one or more of: Internet Protocol (IP) address, InfiniBand address, InfiniBand connection, Fibre Channel (FC) address, FC connection, vendor defined management attribute in a data payload, or another network interface identification and location addressing mechanism.

3. The method of claim 1, further comprising:

generating, by an interrupt handler of the network adapter, the first hardware interrupt for the debugging message received by the network adapter; and queueing, by the network adapter, the first hardware interrupt request in the first of the one or more receive queues of the network adapter.

4. The method of claim 1, wherein the debugging message includes: a back-trace of one of the plurality of CPUs, a register state of one of the plurality of CPUs, a process list, a process back-trace, one or more operational steps for enabling or disabling hardware interrupts for one of the plurality of CPUs, or one or more operational steps for hardware interrupt debugging.

5. The method of claim 1, wherein the debugging message received by the network adapter is a network packet including a payload.

6. The method of claim 5, wherein identifying, by the debugger of the computer system, the debugging commands in the received debugging message, comprises:

reading, by the debugger of the computer system, the payload of the received network packet to identify the debugging commands in the debugging message stored in the first of the one or more receive queues of the network adapter.

7. A computer program product comprising:

one or more computer readable storage media and program instructions stored on the one or more computer readable storage media, the program instructions comprising:

program instructions to bind each of a plurality of central processing units (CPUs) in a computer system to one or more receive queues of a network adapter, wherein each of the one or more receive queues is configured to queue a hardware interrupt request of the network adapter;

program instructions to disable interrupts for one or more of the plurality of CPUs, wherein the one or more of the plurality of CPUs are not available to process hardware interrupt requests queued in the one or more bound receive queues, and an operating system (OS) of the computer system becomes non-responsive;

program instructions to receive, by the network adapter, a debugging message including debugging commands, wherein the debugging message is stored in a first of the one or more receive queues of the network adapter bound to a first of the plurality of CPUs, and wherein the debugging message corresponds to a first hardware interrupt request queued in the first of the one or more receive queues, wherein the debugging message includes a list back-trace of one or more application programs that disabled one or more hardware interrupts;

program instructions to, responsive to determining that the first of the plurality of CPUs is not available to process the first hardware interrupt, receive, by the network adapter, the debugging message including debugging commands, wherein the debugging message is stored in a second of the one or more receive queues of the network adapter bound to a second of the plurality of CPUs, and wherein the debugging message corresponds to a second hardware interrupt request queued in the second of the one or more receive queues; and program instructions to execute the identified debugging commands, by the second of the plurality of CPU's to debug the non-responsive OS of the computer system.

8. The computer program product of claim 7, wherein the program instructions stored on the one or more computer readable storage media further comprise:

program instructions to bind, by the network adapter, the one or more receive queues to a remote node using a destination vector based on one or more of: Internet Protocol (IP) address, InfiniBand address, InfiniBand connection, Fibre Channel (FC) address, FC connection, vendor defined management attribute in a data payload, or another network interface identification and location addressing mechanism.

9. The computer program product of claim 7, wherein the program instructions stored on the one or more computer readable storage media further comprise:

program instructions to generate, by an interrupt handler of the network adapter, the first hardware interrupt for the debugging message received by the network adapter; and program instructions to queue, by the network adapter, the first hardware interrupt request in the first of the one or more receive queues of the network adapter.

10. The computer program product of claim 7, wherein the debugging message includes: a back-trace of one of the plurality of CPUs, a register state of one of the plurality of CPUs, a process list, a process back-trace, one or more operational steps for enabling or disabling hardware interrupts for one of the plurality of CPUs, or one or more operational steps for hardware interrupt debugging.

11. The computer program product of claim 7, wherein the debugging message received by the network adapter is a network packet including a payload.

12. The computer program product of claim 11, wherein the program instructions to identify, by the debugger of the computer system, the debugging commands in the received debugging message, comprises:

program instructions to read, by the debugger of the computer system, the payload of the received network packet to identify the debugging commands in the debugging message stored in the first of the one or more receive queues of the network adapter.

13. A computer system comprising:
one or more computer processors;
one or more computer readable storage media;
program instructions stored on the computer readable storage media for execution by at least one of the one or more processors, the program instructions comprising:
program instructions to bind each of a plurality of central processing units (CPUs) in a computer system to one or more receive queues of a network adapter, wherein each of the one or more receive queues is configured to queue a hardware interrupt request of the network adapter;
program instructions to disable interrupts for one or more of the plurality of CPUs, wherein the one or more of the plurality of CPUs are not available to process hardware interrupt requests queued in the one or more bound receive queues, and an operating system (OS) of the computer system becomes non-responsive;
program instructions to receive, by the network adapter, a debugging message including debugging commands, wherein the debugging message is stored in a first of the one or more receive queues of the network adapter bound to a first of the plurality of CPUs, and wherein the debugging message corresponds to a first hardware interrupt request queued in the first of the one or more receive queues, wherein the debugging message includes a list back-trace of one or more application programs that disabled one or more hardware interrupts;
program instructions to, responsive to determining that the first of the plurality of CPUs is not available to process the first hardware interrupt, receive, by the network adapter, the debugging message including debugging commands, wherein the debugging message is stored in a second of the one or more receive queues of the network adapter bound to a second of the plurality of CPUs, and wherein the debugging message corresponds to a second hardware interrupt request queued in the second of the one or more receive queues; and
program instructions to execute the identified debugging commands, by the second of the plurality of CPU's to debug the non-responsive OS of the computer system.

14. The computer system of claim 13, wherein the program instructions stored on the one or more computer readable storage media further comprise:
program instructions to bind, by the network adapter, the one or more receive queues to a remote node using a destination vector based on one or more of: Internet Protocol (IP) address, InfiniBand address, InfiniBand connection, Fibre Channel (FC) address, FC connection, vendor defined management attribute in a data payload, or another network interface identification and location addressing mechanism.

15. The computer system of claim 13, wherein the program instructions stored on the one or more computer readable storage media further comprise:
program instructions to generate, by an interrupt handler of the network adapter, the first hardware interrupt for the debugging message received by the network adapter; and
program instructions to queue, by the network adapter, the first hardware interrupt request in the first of the one or more receive queues of the network adapter.

16. The computer system of claim 13, wherein the debugging message includes: a back-trace of one of the plurality of CPUs, a register state of one of the plurality of CPUs, a process list, a process back-trace, one or more operational steps for enabling or disabling hardware interrupts for one of the plurality of CPUs, or one or more operational steps for hardware interrupt debugging.

17. The computer system of claim 13, wherein the debugging message received by the network adapter is a network packet including a payload.

18. The computer system of claim 17, wherein the program instructions to identify, by the debugger of the computer system, the debugging commands in the received debugging message, comprises:
program instructions to read, by the debugger of the computer system, the payload of the received network packet to identify the debugging commands in the debugging message stored in the first of the one or more receive queues of the network adapter.

* * * * *